United States Patent
Hensley et al.

[11] Patent Number: 5,898,730
[45] Date of Patent: Apr. 27, 1999

[54] METHOD FOR DETERMINING SIGNAL QUALITY OF A COMMUNICATION CHANNEL

[75] Inventors: David A. Hensley, Wheaton; Steven J. Charnota, Elgin, both of Ill.

[73] Assignee: Motorola, Inc., Schaumburg, Ill.

[21] Appl. No.: 08/771,738

[22] Filed: Dec. 20, 1996

[51] Int. Cl.[6] .................................................. H04B 3/46
[52] U.S. Cl. .................... 375/224; 370/321; 370/330; 370/331; 370/332; 375/227
[58] Field of Search .......................... 370/321, 330–332; 375/200, 224; 455/67.1, 515, 525

[56] References Cited

U.S. PATENT DOCUMENTS

| | | | |
|---|---|---|---|
| 5,440,582 | 8/1995 | Birchler et al. | 375/227 |
| 5,506,869 | 4/1996 | Royer | 375/244 |
| 5,579,306 | 11/1996 | Dent | 370/50 |
| 5,657,348 | 8/1997 | Ericsson et al. | 375/244 |
| 5,715,279 | 2/1998 | Laakso et al. | 375/244 |
| 5,745,839 | 4/1998 | Lieberman | 455/10 |
| 5,751,767 | 5/1998 | Tatsumi | 375/224 |
| 5,752,190 | 5/1998 | Kaewell, Jr. et al. | 455/436 |
| 5,761,211 | 6/1998 | Yamaguchi et al. | 375/224 |

*Primary Examiner*—Stephen Chin
*Assistant Examiner*—Joseph Roundtree
*Attorney, Agent, or Firm*—Kenneth A. Haas

[57] ABSTRACT

A communication device (107) employs a method for determining signal quality of a communication channel (117) in a communication system (100). Upon receipt of a radio signal, a communication device (107), such as a portable radio, determines the signal quality of at least two portions (121, 124) of the communication channel (117) over which the radio signal was transmitted. The communication device (107) then determines which of the determined signal qualities is lowest and selects the lowest determined signal quality as the signal quality of the communication channel (117). The communication device (107) can then use the selected channel quality in the handoff decision-making process.

20 Claims, 4 Drawing Sheets

METHOD FOR DETERMINING SIGNAL QUALITY OF A COMMUNICATION CHANNEL

FIELD OF THE INVENTION

The present invention relates generally to communication systems and, in particular, to determining signal quality of a communication channel in a communication system that geographically reuses communication channels.

BACKGROUND OF THE INVENTION

Communication systems that geographically reuse communication channels are known These systems allocate a predetermined set of communication channels in one geographic area and reuse the same set of communication channels in one or more other geographic areas. This reuse technique improves communication capacity by minimizing the number of communication channels necessary to provide communication service in a large geographic area comprised of several smaller geographic areas. As is also known, a communication channel may be a frequency carrier or a pair of frequency carriers in a frequency division multiple access (FDMA) communication system, a time slot or a pair time slots in a time division multiple access (TDMA) communication system, or any other radio frequency (RF) transmission medium.

Two of the most common communication systems that geographically reuse communication channels are cellular communication systems and trunked mobile communication systems. In both communication systems, allocation of a communication channel begins when a communication unit requests communication service. Based on channel availability and signal quality, a system controller assigns the communication channel to the communication unit A communication, such as a conversation or a facsimile transmission, occurs on the communication channel between the communication unit and another communication unit or between the communication unit and a subscriber to a public service telephone network. The communication continues until completion or an interruption in service occurs. Upon conclusion of the communication, the system controller retrieves the communication channel, thereby making the communication channel available for another communication.

An important parameter in identifying an acceptable communication channel is signal quality. In a wireless communication system, the communication channels are typically RF channels which occupy predetermined bandwidths. When information signals are transmitted on the RF channels, undesired channel effects, such as fading, interference and noise, alter the information signals during transmission. Thus, the information signals received by a receiver in the communication unit, or a base station, are corrupted by the undesired channel effects. By ascertaining an indication of the corruption on available communication channels, the least corrupted communication channel may be selected for the communication. This indication of corruption is known as signal quality.

In geographic reuse communication systems, signal quality is typically limited by the quantity of co-channel interference present on the RF channel. Co-channel interference occurs when receivers receive unwanted information signals from neighboring communication units, or base stations, transmitting on the same RF channel as the desired RF channel. Thus, signal quality decreases as co-channel interference increases.

Received signal strength indication (RSSI), bit error rate (BER), and carrier-to-interference plus noise ratio are three common methods of estimating signal quality. In an RSSI estimate, the receiver measures the level of a received signal on the desired RF channel. This measurement provides a summation of signal levels including the desired information signal (C), the co-channel interference (I), and the noise (N) on the desired RF channel. Accordingly, RSSI does not distinguish between the desired information signal level and the level of undesired channel effects. In a BER measurement, the receiver measures the number of errors detected in a received bit stream BER measurements provide accurate estimates of signal quality in high error rate environments, but in geographic areas where error rates are low, multiple measurements and excessive averaging times may be required to obtain the accurate estimates. In a carrier-to-interference plus noise ratio determination, the receiver isolates the desired information signal (C) from the summation of co-channel interference and noise (I+N) and forms a ratio of the two quantities (C/(I+N)) to more accurately evaluate the quality of the communication channel used to convey the desired information. One approach to determining carrier-to-interference plus noise ratios in a digital communication system is described in U.S. Pat. No. 5,440,582, entitled "Method and Apparatus for Determining Signal Usability" and assigned to Motorola, Inc.

Presently, the three common methods of determining signal quality of a communication channel make such a determination by evaluating the communication channel as a whole. For example, if a TDMA system permits a voice user to transmit in only one time slot per time frame, then the transmission channel for each voice user is one slot per time frame. Accordingly, to measure the signal quality of such a transmission channel, the receiver in the TDMA system measures the signal quality of the assigned slot in each time frame to determine the overall channel signal quality. However, current communication systems are embarking on efforts to improve received audio quality by increasing the amount of digitally encoded voice transmitted in a particular time period. In such systems, two or more time slots per time frame may be necessary to convey the encoded voice. In addition, these new systems may be dual-mode, simultaneously permitting improved audio quality transmission for one user in two slots per time fame (e.g., in a telephone-interconnect mode) and standard audio quality transmission for another user in one slot per frame (e.g., in a dispatch mode).

In such dual-mode systems, existing signal quality measurement approaches (i.e., measuring one slot per time frame) are inefficient for obtaining accurate channel signal quality for improved audio quality transmissions because a standard audio quality transmission in one slot per time frame may be interfering with an improved audio quality transmission in two slots per time frame. Such interference from the standard audio quality transmission is detectable only if the receiver receiving the improved audio quality transmission is measuring the signal quality of the particular time slot of the two slot improved audio channel that contains the interfering standard audio transmission. If the receiver of the improved audio quality transmission is not measuring the signal quality of the correct time slot of the two slot channel, the receiver will, in most cases, determine an errantly higher or better channel signal quality.

Therefore, a need exists for a method of determining signal quality of a communication channel that accurately detects signal quality in the aforementioned dual-mode type of communication system. Such a method that further permits handoff decisions to be made based on such a signal quality determination would be an improvement over the prior art.

DESCRIPTION OF A PREFERRED EMBODIMENT

Generally, the present invention provides a method for determining signal quality of a communication channel in a communication system. Upon receipt of a radio signal, a communication device, such as a portable radio, determines the signal quality of at least two portions of the communication channel over which the received signal was transmitted. The communication device then determines which of the determined signal qualities is lowest and selects the lowest determined signal quality as the signal quality of the communication channel By determining channel signal quality in this manner, the present invention permits communication devices to make intelligent handoff decisions when operating in communication systems, such as TDMA communication systems using multiple time slot interleaving patterns, in which one portion of the communication channel is subject to interference and noise, while another portion of the communication channel is not.

Figure 1:
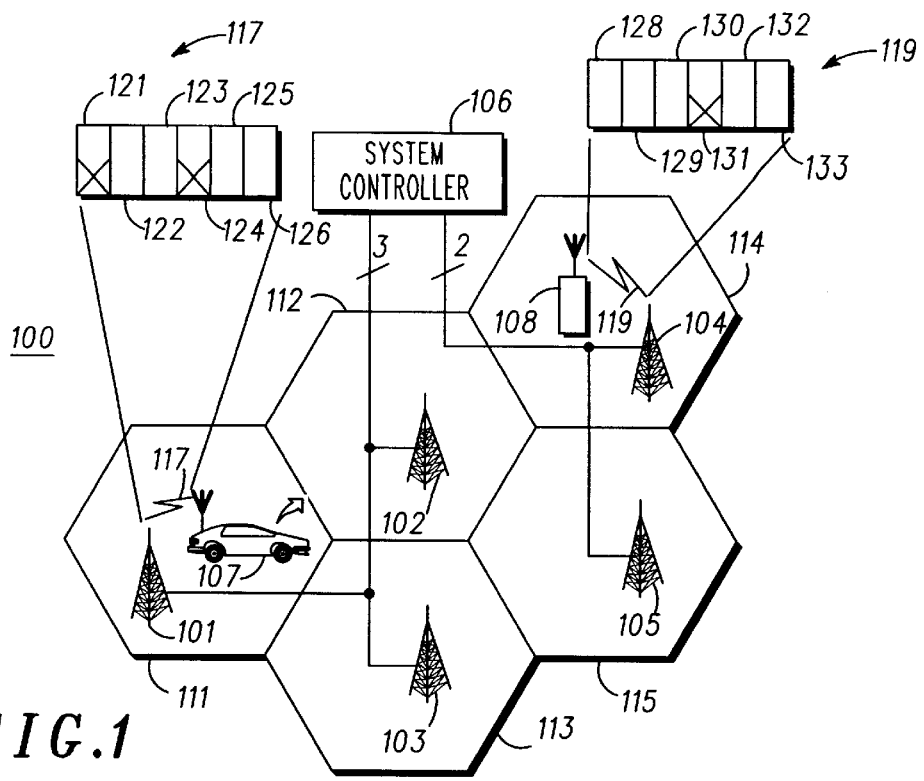
FIG. 1 illustrates a block diagram depiction of a communication system that may beneficially employ the present invention.

The present invention can be more fully described with reference to FIGS. 1–9. FIG. 1 illustrates a block diagram depiction of a communication system 100 that may beneficially employ the present invention. The communication system 100 includes a plurality of base sites 101–105, a system controller 106, and a plurality of communication devices 107–108 that communicate in the system 100 via radio communication channels 117, 119. Each of the plurality of base sites 101–105 provides communication services to a respective service coverage area 111–115. The base sites 101–105 and the system controller 106 together comprise a substantial part of the communication system infrastructure.

In a preferred embodiment, the communication system 100 comprises a time division multiple access (TDMA) communication system, such as the "iDEN" trunked communication system platform that is commercially available from Motorola, Inc., that facilitates two time slot interleave patterns, namely 6-to-1 and 3-to-1, to form the system's communication channels 117, 119. In the preferred embodiment, the 6-to-1 communication channel 119 comprises one time slot (e.g., 131) per 90 millisecond (ms) time frame, wherein each time frame consists of six time slots 128–133. On the other hand, the 3-to-1 communication channel 117 comprises two time slots (e.g., 121, 124) per 90 ms time frame, wherein each time frame also consists of six time slots 121–126. In an alternative embodiment, the communication system 100 might comprise a frequency division multiple access (FDMA) system that facilitates two or more transmission bandwidths (e.g., 12.5 KHz and 25 KHz) to form the FDMA communication channels.

Each base site 101–105 preferably comprises an "iDEN" Enhanced Base Transceiver Site (EBTS) and each communication device 107–108 preferably comprises a mobile radio (e.g., 107), a portable radio (e.g., 108), or a radiotelephone. The system controller 106 preferably comprises an "iDEN" Base Site Controller and an "iDEN" Dispatch Application Processor. All "iDEN" products are commercially available from Motorola, Inc.

Operation of the communication system 100 in accordance with the present invention occurs substantially as follows. Upon powering on, registering with the system controller 106 in accordance with known techniques, and determining a desire to communicate, a communication device 107 transmits a channel service request (such as a request to engage in a telephone interconnect call) to the base site 101 serving the coverage area 111 containing the communication device 107. The channel request is typically transmitted over a system control channel. Upon receiving the request, the base site 101 forwards the request to the system controller 106. The system controller 106 determines which service the request is for and whether a communication channel is available at the serving base site 101 to support the requested service. Upon determining that at least one channel is available to support the requested service, the system controller 106 allocates an available communication channel 117 to the requesting communication device and, in the case of a telephone interconnect call, interacts with a switching center (not shown) to establish the appropriate switching connections to the public switched telephone network. In the preferred embodiment, the allocation for a telephone interconnect call comprises two frequencies and four time slots, one frequency and two time slots for inbound link (communication device-to base site) transmissions and the other frequency and other two time slots for outbound link (base site-to-communication device) transmissions.

For example, the allocation might provide for inbound link transmissions at 851.125 MHz in the third and sixth time slots of each time division multiplexed (TDM) time frame of the communication channel 117 and outbound link transmissions at 899.125 MHz in the first and fourth time slots (i.e., time slots 121 and 124) of each TDM time frame of communication channel 117, wherein each link of the communication channel 117 consists of six time slots (slots 121–126 on the outbound link) per 90 ms TDM time frame. Thus, in the preferred embodiment, telephone interconnect calls use a 3:1 time slot interleave pattern.

Upon receiving the allocation from the system controller 106, the serving base site 101 informs the communication device 107 of the allocation via the control channel. Once informed, the communication device 107 adjusts its transmitter and receiver to transmit and receive, respectively, on the allocated frequencies and time slots. The communication device 107 is then ready to begin participating in its communication.

While participating in the communication, the communication device 107 uses the method of the present invention to determine the signal quality of the outbound link of the communication channel 117, Upon receiving each base site transmission or a predetermined number of transmitted time frames, the communication device 107 determines a signal quality for each portion of the communication channel 117. In the preferred embodiment, a portion of the communication channel 117 comprises one time slot. Accordingly, the communication device 107 preferably determines a first signal quality for information received in the first time slot 121 of each received time frame or each predetermined number of received time frames and a second signal quality for information received in the fourth time slot 124 of each received time frame or each predetermined number of received time frames. In the preferred embodiment, the communication device 107 determines the carrier-to-interference plus noise ratio (C/(I+N)) of the received signal as the signal quality for a particular channel portion (i.e., time slot 121, 124). However, in an alternative embodiment, the communication device 107 might determine a received signal strength indication (RSSI) or a bit error rate (BER) of the received signal as the signal quality for a particular channel portion.

The determined signal qualities for the channel portions are affected in geographic reuse communication systems by co-channel transmissions of other base sites or communication devices. Thus, the signal quality of the outbound link time slots 121, 124 may be affected (degraded) by transmissions of other telephone interconnect calls on the same communication channel and by transmissions of other dispatch calls on the same communication channel 119. In the preferred embodiment, each dispatch call is conveyed over two frequencies and two time slots, one frequency and one time slot per six slot TDM time frame for inbound link transmissions and the other frequency and other time slot per time frame for outbound link transmissions. Thus, in the preferred embodiment, dispatch calls use a 6:1 time slot interleave pattern. Consequently, a base site 104 transmitting a dispatch call to a communication device 108 in a different service coverage area 114 over an outbound frequency identical to that of the outbound frequency of communication channel 117 and in a time slot 131 identical to a time slot 124 of communication channel 117 will interfere with the outbound transmission of base site 101 on time slot 124 as perceived by communication device 107 However, the other transmission time slot 121 of communication channel 117 will remain unaffected by the transmission of base site 104. By measuring signal quality of each channel portion, the present invention can account for interference that exists on only one of the channel portions, regardless of which channel portion has the interference Once the communication device 107 has determined the signal quality for each channel portion, the communication device 107 determines which of the signal quality determinations is indicative of lowest signal quality. This determination may be accomplished in any one of a variety of ways based on which technique is selected for determining the signal quality of each channel portion. The preferred embodiments for determining which of the signal quality determinations is indicative of lowest signal quality is described below with regard to FIGS. 5 and 8. Alternative embodiments for making such a determination are described below with regard to FIGS. 4–7. Upon determining which of the signal quality determinations is indicative of lowest signal quality, the communication device 107 selects the signal quality determination indicative of lowest signal quality as the signal quality for the complete communication channel 117. For example, when the C/(I+N) for the channel portion associated with time slot 121 is less than the C/(I+N) for the channel portion associated with time slot 124, the C/(I+N) associated with time slot 121 is selected as the signal quality for the outbound link of the overall communication channel 117.

Having determined the communication channel signal quality, the communication device 107 preferably compares the channel quality to a desired signal quality if such a comparison was not performed during the communication channel signal quality determination. When the communication channel signal quality is worse than the desired signal quality (e.g., when the communication channel C/(I+N) is less than a desired C/(I+N) or the communication channel BER is greater than a desired BER), the communication device 107 preferably transmits a handoff request to the serving base site 101. The serving base site 101 forwards the request to the system controller 106. Upon receipt of the request, the system controller 106 performs the handoff in accordance with known techniques. For example, when the communication device 107 is moving as indicated by the arrow, the system controller 106 will likely handoff the communication device from communication channel 117 to a communication channel supported by base site 102.

It should be noted that although the present invention was described above with regard to determining signal quality of a communication channel's outbound link, the present invention is equally applicable for determining signal quality of a communication channel's inbound link. In this case (i.e., when determining inbound link quality), the channel portion signal quality determinations and overall communication channel signal quality selection are performed by a base site (e.g, 101).

As described above, the present invention provides a method for accurately determining signal quality of a multi-portion communication channel in the presence of interference on less than all portions of the communication channel. In contrast to existing signal quality detection methodologies that measure signal quality on only one portion (most often the only portion) of the communication channel, the present invention evaluates signal quality on multiple portions of the communication channel, thereby increasing the probability that interference present on any portion of the communication channel will be detected and considered in determining the signal quality of the overall communication channel.

Accordingly, the present invention provides a more accurate and more reliable signal quality determination than existing signal quality detection techniques.

Figure 2:
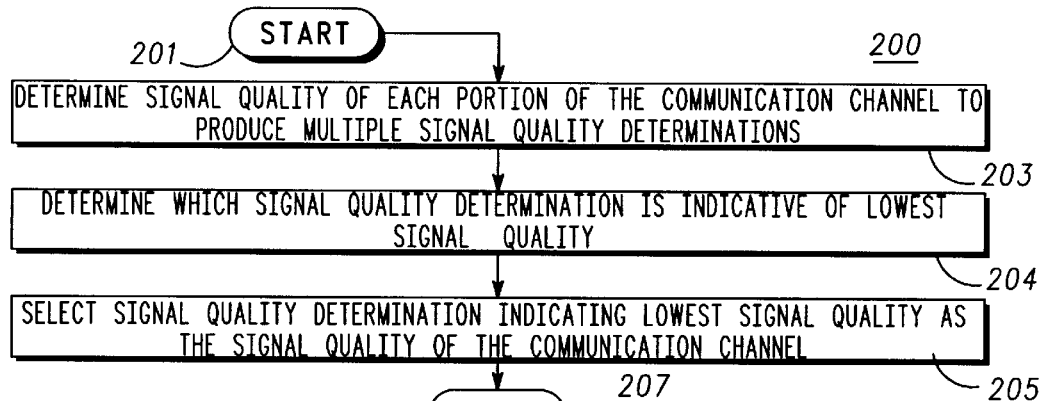
FIG. 2 illustrates a logic flow diagram of steps executed by a communication device to determine signal quality of a communication channel in accordance with the present invention.

FIG. 2 illustrates a logic flow diagram 200 of steps executed by a communication device to determine signal quality of a communication channel in accordance with the present invention.

The logic flow begins (201) when a communication device receives a signal in each portion of the communication channel and determines (203) a signal quality of each channel portion to produce multiple signal quality determinations. The communication device then determines (204) which of the multiple signal quality determinations is indicative of lowest signal quality and selects (205) the signal quality determination indicating lowest signal quality as the signal quality of the communication channel, thereby ending (207) the logic flow. The determination of which of the multiple signal quality determinations is indicative of lowest signal quality may be accomplished in any one of a variety of ways as discussed below with regard to FIGS. 3–7.

Figure 3:
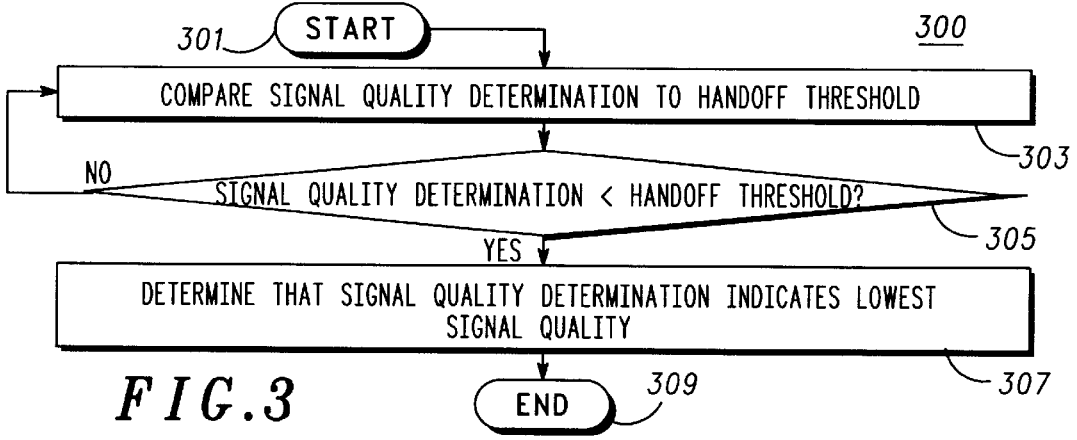
FIG. 3 illustrates a logic flow diagram of steps executed to determine which portion of a communication channel has lowest signal quality in accordance with a first embodiment of the present invention.

FIG. 3 illustrates a logic flow diagram 300 of steps executed to determine which portion of a communication channel has lowest signal quality in accordance with a first embodiment of the present invention. The logic flow begins (301) when the communication device, upon determining the signal quality of each communication channel portion, compares (303) one of the signal quality determinations to a handoff threshold. The communication device then determines (305) whether the signal quality determination is less than the handoff threshold (e.g., 30 decibels (dB) when C/(I+N) is the quantity used for the signal quality determination). When the signal quality determination is less than the handoff threshold, the communication device determines (307) that the signal quality determination is indicative of lowest signal quality and the logic flow ends (309). When the signal quality determination is not less than the handoff threshold, the communication device compares (303) another one of the signal quality determinations to the handoff threshold and the logic flow continues at decision block 305. This embodiment may be applied when the signal quality determination is C/(I+N), as in the preferred embodiment, RSSI, or any other positively-referenced signal quality metric (i.e., a signal quality metric in which larger metric values are more desirable).

Figure 4:
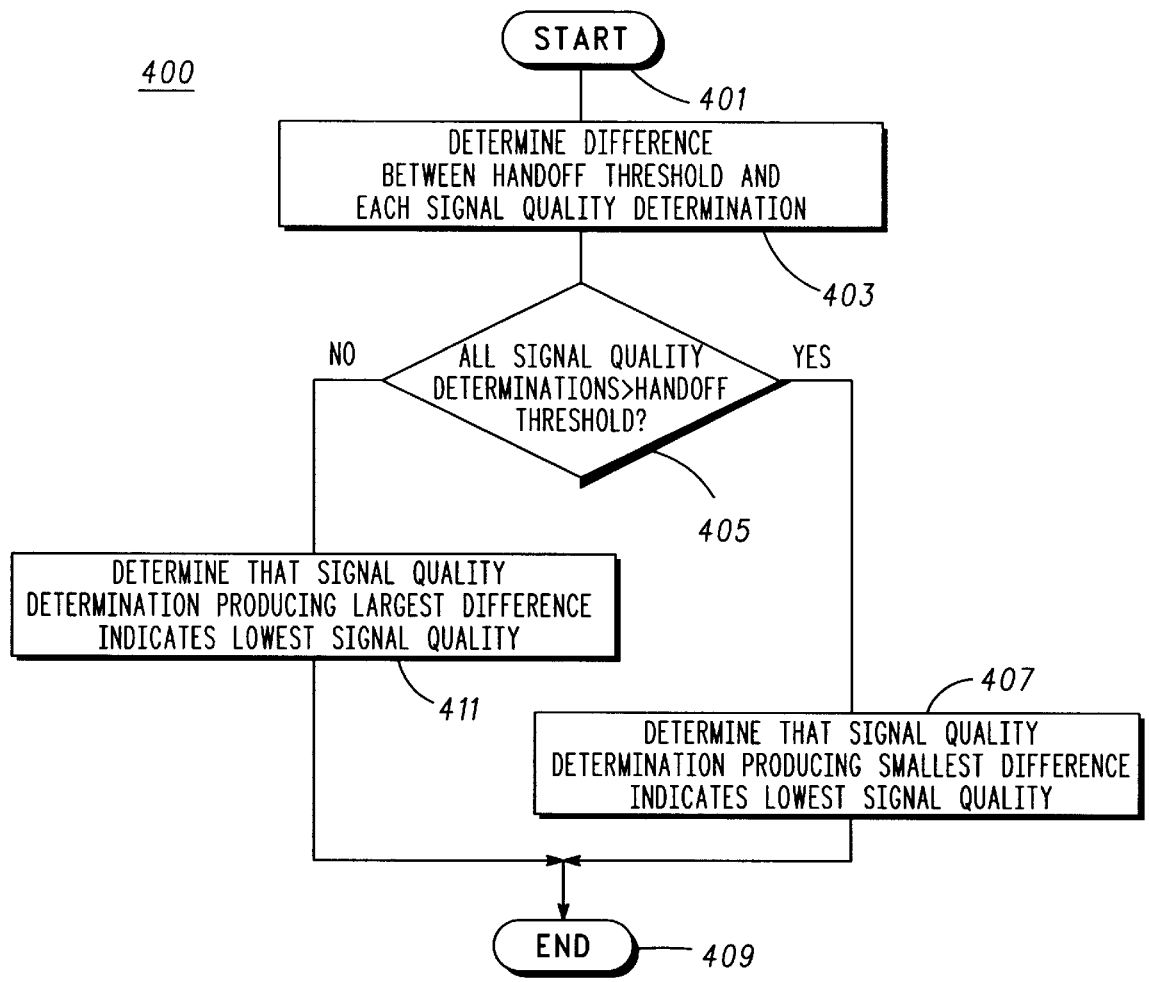
FIG. 4 illustrates a logic flow diagram of steps executed to determine which portion of a communication channel has lowest signal quality in accordance with a second embodiment of the present invention.

FIG. 4 illustrates a logic flow diagram 400 of steps executed to determine which portion of a communication channel has lowest signal quality in accordance with a second embodiment of the present invention. The logic flow begins (401) when the communication device, upon determining the signal quality of each communication channel portion, determines (403) a difference between a handoff threshold and each signal quality determination. The communication device also determines (405) whether each signal quality determination is greater than the handoff threshold. When all the signal quality determinations are greater than or equal to the handoff threshold, the communication device determines (407) that the signal quality determination producing the smallest difference indicates the lowest signal quality. However, when all the signal quality determinations are less than or equal to the handoff threshold, the communication device determines (411) that the signal quality determination producing the largest difference indicates the lowest signal quality.

For example, if the communication channel has two portions and the RSSI of one channel portion is –90 dBm (decibels above a milliwatt), the RSSI of the other channel portion is –100 dBm, and the handoff threshold is –120 dBm, then the difference produced by the RSSI of the first channel portion is 30 dB and the difference produced by RSSI of the second channel portion is 20 dB.

Accordingly, pursuant to this embodiment, the RSSI (i.e., –100 dBm) of the second channel portion is indicative of lowest signal quality because both signal quality determinations are above the handoff threshold (i.e., –90 dBm and –100 dBm are greater than –120 dBm) and the RSSI of the second channel portion produced the smallest difference. Once the signal quality determination indicative of lowest signal quality is determined (407, 411), the logic flow ends (409). Similar to the logic flow of FIG. 3, this embodiment may be applied when the signal quality determination is C/(I+N), RSSI, or any other positively-referenced signal quality metric.

Figure 5:
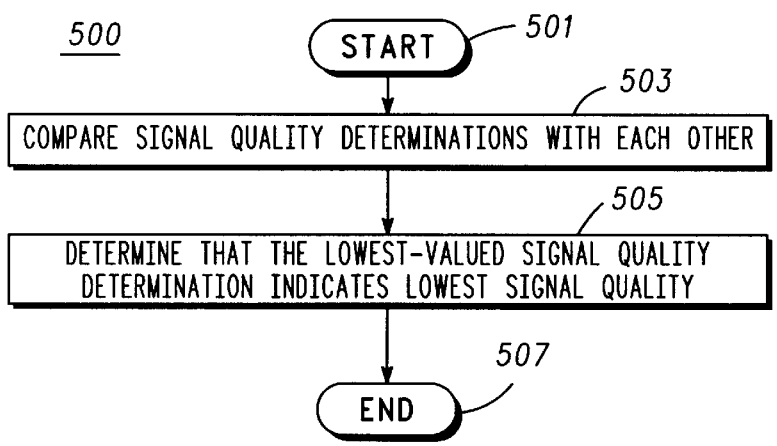
FIG. 5 illustrates a logic flow diagram of steps executed to determine which portion of a communication channel has lowest signal quality in accordance with a third embodiment of the present invention.

FIG. 5 illustrates a logic flow diagram 500 of steps executed to determine which portion of a communication channel has lowest signal quality in accordance with a third embodiment of the present invention. The logic flow begins (501) when the communication device, upon determining the signal quality of each communication channel portion, compares (503) each signal quality determination with every other signal quality determination. The communication device then determines (505) that the lowest-valued signal quality determination is indicative of lowest signal quality and the logic flow ends (507). Similar to the logic flows of FIGS. 3 and 4, this embodiment may be applied when the signal quality determination is C/(I+N), RSSI, or any other positively-referenced signal quality metric.

Figure 6:
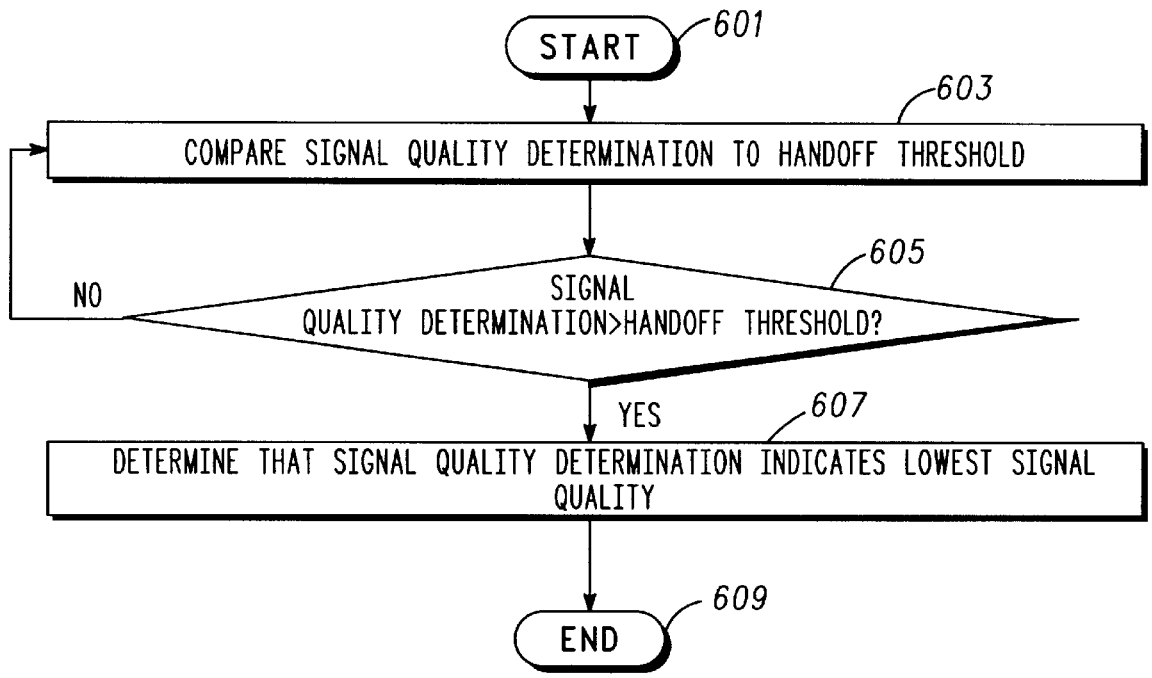
FIG. 6 illustrates a logic flow diagram of steps executed to determine which portion of a communication channel has lowest signal quality in accordance with a fourth embodiment of the present invention.

FIG. 6 illustrates a logic flow diagram 600 of steps executed to determine which portion of a communication channel has lowest signal quality in accordance with a fourth embodiment of the present invention. The logic flow begins (601) when the communication device, upon determining the signal quality of each communication channel portion, compares (603) one of the signal quality determinations to a handoff threshold. The communication device then determines (605) whether the signal quality determination is greater than the handoff threshold (e.g., a BER of $10^{-3}$ when BER is the quantity used for the signal quality determination). When the signal quality determination is greater than the handoff threshold, the communication device determines (607) that the signal quality determination is indicative of lowest signal quality and the logic flow ends (609). When the signal quality determination is not greater than the handoff threshold, the communication device compares (603) another one of the signal quality determinations to the handoff threshold and the logic flow continues at decision block 605. This embodiment may be applied when the signal quality determination is BER or any other negatively-referenced signal quality metric (i.e., a signal quality metric in which smaller metric values are more desirable), such as word error rate or frame erasure rate.

Figure 7:
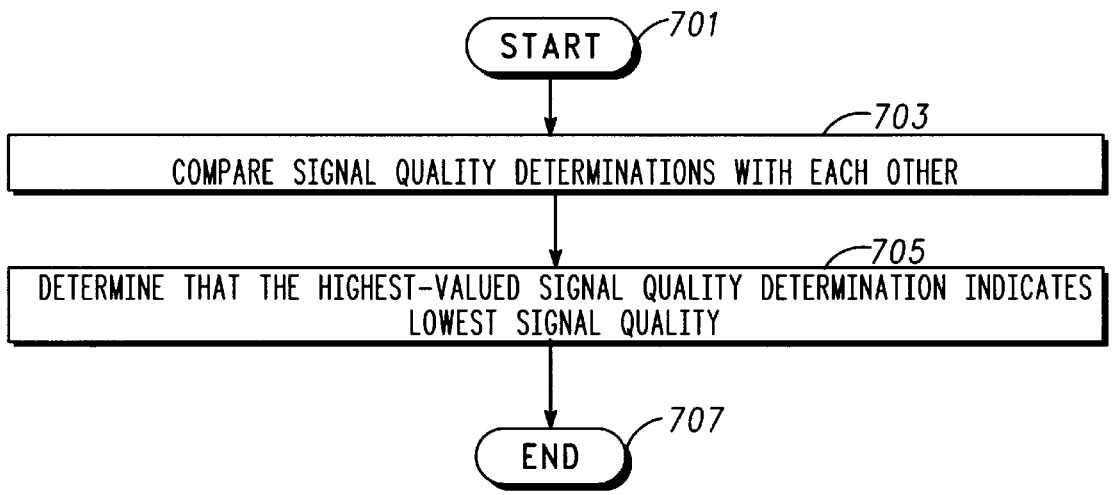
FIG. 7 illustrates a logic flow diagram of steps executed to determine which portion of a communication channel has lowest signal quality in accordance with a fifth embodiment of the present invention.
Figure 8:
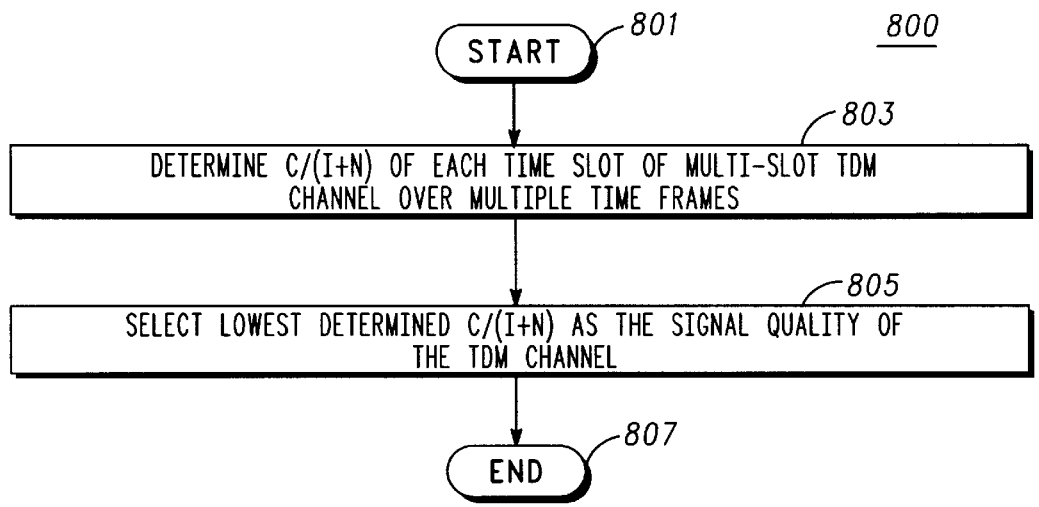
FIG. 8 illustrates a logic flow diagram of steps executed by a communication device to determine signal quality of a time division multiplexed (TDM) communication channel in accordance with the present invention.

FIG. 7 illustrates a logic flow diagram 700 of steps executed to determine which portion of a communication channel has lowest signal quality in accordance with a fifth embodiment of the present invention. The logic flow begins (701) when the communication device, upon determining the signal quality of each communication channel portion, compares (703) each signal quality determination with every other signal quality determination. The communication device then determines (705) that the highest-valued signal quality determination is indicative of lowest signal quality and the logic flow ends (707). Similar to the logic flow of FIG. 6, this embodiment may be applied when the signal quality determination is BER or any other negatively-referenced signal quality metric. It should also be noted that, although not explicitly depicted, one of ordinary skill will appreciate that a logic flow similar to FIG. 4, with minor modifications to blocks 407 and 411, may alternatively be used to determine which portion of a communication channel has lowest signal quality when the signal quality determination is BER or any other negatively-referenced signal quality metric FIG. 8 illustrates a logic flow diagram 800 of steps executed by a communication device to determine signal quality of a TDM communication channel in accordance with a preferred embodiment of present invention. The logic flow begins (801) when the communication device determines (803) the C/(I+N) of each time slot of the multi-slot TDM channel over multiple time frames. One method for performing such a determination for a one slot per TDM frame channel is described in detail in U.S. Pat. No. 5,440,582. The approach of U.S. Pat. No. 5,440,582 is preferably used in the present embodiment for each time slot of the multi-slot TDM channel. In the approach described in U.S. Pat. No. 5,440,582, the undesired (I+N) and desired (C) portions are averaged before producing the C/(I+N) metric for the single slot per TDM frame channel In the preferred embodiment, the desired and undesired portions of each slot of the multi-slot channel are averaged over 28 time frames. Thus, the preferred C/(I+N) for each slot of the multi-slot TDM channel is determined once every 28 time frames.

Once the C/(I+N) of each time slot of the multi-slot TDM channel is determined, the communication device selects (805) the C/(I+N) having the lowest value (preferably in dB) as the signal quality of the multi-slot TDM communication channel, and the logic flow ends (807).

Figure 9:
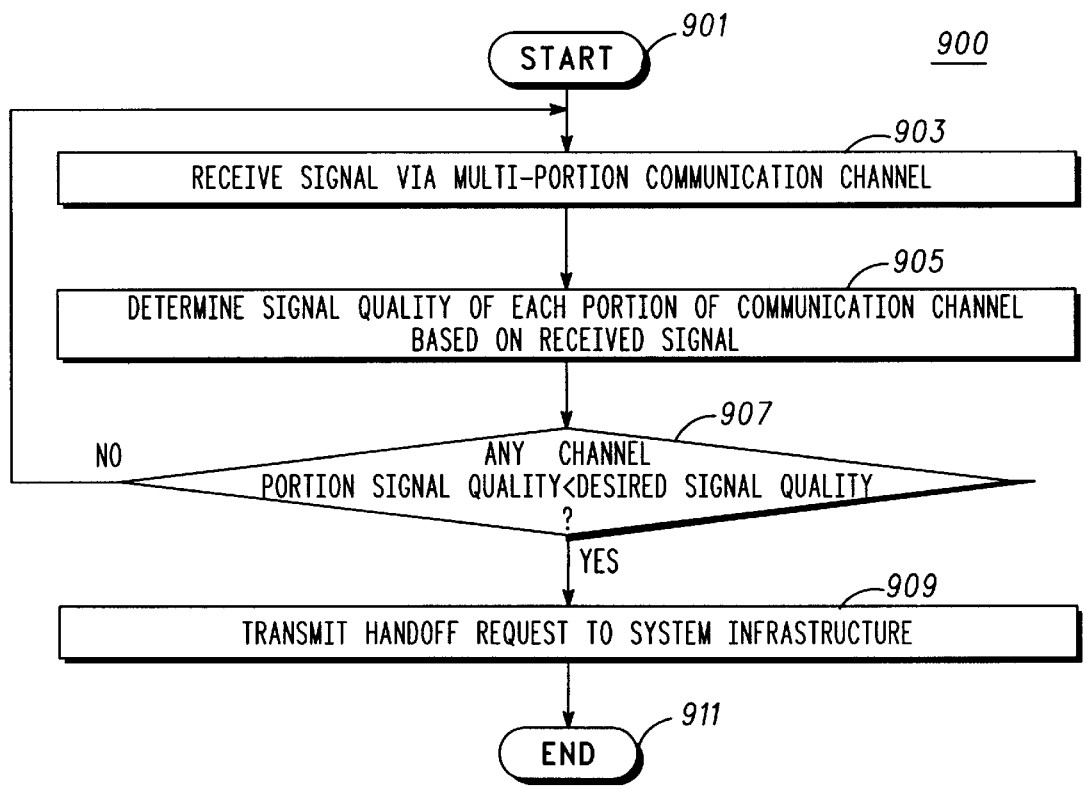
FIG. 9 illustrates a logic flow diagram of steps executed by a communication device to determine that the communication device needs to be handed off in accordance with the present invention.

FIG. 9 illustrates a logic flow diagram 900 of steps executed by a communication device to determine that the communication device needs to be handed off in accordance with the present invention. The logic flow begins (901) when the communication device receives (903) a signal in each portion of a multi-portion communication channel. The communication device then determines (905) the signal quality of each portion of the communication channel based on the signal received in each respective portion. As described above, the signal quality determinations may be C/(I+N), RSSI, BER, or any other signal quality metric.

Upon determining the signal qualities of each channel portion, the communication device determines (907) whether the signal quality of any channel portion is less than a desired signal quality that, in a preferred embodiment, corresponds to a handoff threshold. For positively-referenced signal qualities, such as C/(I+N) and RSSI, the signal quality of a channel portion is less than a desired signal quality when the signal quality of the channel portion is less than the handoff threshold. However, for negatively-referenced signal qualities, such as BER or word error rate, the signal quality of a channel portion is less than a desired signal quality when the signal quality of the channel portion is greater than the handoff threshold. When a signal quality of at least one channel portion of the multi-portion communication channel is less than the desired signal quality, the communication device determines that the communication device needs to be handed off to a new communication channel and, accordingly, transmits (909) a handoff request to the system infrastructure, thereby ending (911) the logic flow. When the signal qualities of all the channel portions of the multi-portion communication channel are greater than or equal to the desired signal quality, the communication device determines that the current communication channel has sufficiently high signal quality and continues receiving (903) signals via the current communication channel.

The present invention provides a method for determining signal quality of a communication channel in a communication system. With this invention, interference and noise present on all portions of a communication channel can be taken into account when determining overall channel signal quality, in contrast to existing approaches that take into account interference and noise in one portion of the communication channel only when evaluating such signal quality. Consequently, the present invention allows communication devices in TDMA communication systems having multiple time slot interleave patterns to obtain more accurate representations of overall TDM channel quality, as compared with existing signal quality determination techniques, and to use such accurate representations in the handoff decision process to thereby increase the probability of high quality voice reception.

While the present invention has been particularly shown and described with reference to particular embodiments thereof, it will be understood by those skilled in the art that various changes in form and details may be made therein without departing from the spirit and scope of the present invention.

We claim:

1. A method for determining signal quality of a communication channel, the method comprising the steps of:

determining a signal quality of a first portion of the communication channel to produce a first signal quality determination;

determining a signal quality of at least a second portion of the communication channel to produce at least a second signal quality determination, wherein the second portion of the communication channel comprises a portion of the communication channel independent of the first portion of the communication channel;

determining which signal quality determination of the first signal quality determination and at least the second signal quality determination is indicative of lowest signal quality; and selecting a signal quality determination of the first signal quality determination and at least the second signal quality determination that is indicative of lowest signal quality as the signal quality of the communication channel.

2. The method of claim 1, wherein the first signal quality determination and at least the second signal quality determination comprise carrier-to-interference plus noise ratios.

3. The method of claim 1, wherein the first signal quality determination and at least the second signal quality determination comprise received signal strength indications.

4. The method of claim 1, wherein the step of determining which signal quality determination of the first signal quality determination and at least the second signal quality determination is indicative of lowest signal quality comprises the steps of:

comparing the first signal quality determination to a signal quality threshold; and when the first signal quality determination is less than the signal quality threshold, determining that the first signal quality determination indicates lowest signal quality.

5. The method of claim 1, wherein the step of determining which signal quality determination of the first signal quality determination and at least the second signal quality determination is indicative of lowest signal quality comprises the steps of:

determining a difference between the first signal quality determination and a signal quality threshold to produce a first difference;

determining a difference between at least the second signal quality determination and the signal quality threshold to produce at least a second difference;

when the first signal quality determination and at least the second signal quality determination are greater than the signal quality threshold, determining that the first signal quality determination indicates lowest signal quality when the first difference is less than at least the second difference; and when the first signal quality determination and at least the second signal quality determination are less than the signal quality threshold, determining that the first signal quality determination indicates lowest signal quality when the first difference is greater than at least the second difference.

6. The method of claim 1, wherein the step of determining which signal quality determination of the first signal quality determination and at least the second signal quality determination is indicative of lowest signal quality comprises the steps of:

comparing the first signal quality determination to at least the second signal quality determination; and determining that the first signal quality determination indicates lowest signal quality when the first signal quality determination is less than at least the second signal quality determination.

7. The method of claim 1, wherein the first signal quality determination and at least the second signal quality determination comprise bit error rates.

8. The method of claim 7, wherein the step of determining which signal quality determination of the first signal quality determination and at least the second signal quality determination is indicative of lowest signal quality comprises the step of determining that the first signal quality determination indicates lowest signal quality when the first signal quality determination is greater than at least the second signal quality determination.

9. The method of claim 1, wherein the first signal quality determination comprises a first bit error rate and wherein the step of determining which signal quality determination of the first signal quality determination and at least the second signal quality determination is indicative of lowest signal quality comprises the step of:

comparing the first signal quality determination to a signal quality threshold; and determining that the first signal quality determination indicates lowest signal quality when the first signal quality determination is greater than the signal quality threshold.

10. The method of claim 1, wherein the communication channel comprises a plurality of time slots per time division multiplexed time frame.

11. A method for determining signal quality of a time division multiplexed communication channel that includes a plurality of time slots per time frame, the method comprising the steps of:

determining a carrier-to-interference plus noise ratio of a first time slot of the plurality of time slots to produce a first signal quality determination;

determining a carrier-to-interference plus noise ratio of a second time slot of the plurality of time slots to produce a second signal quality determination, wherein the second time slot is a different time slot than the first time slot; and selecting a signal quality determination of the first signal quality determination and the second signal quality determination having a lesser carrier-to-interference plus noise ratio as the signal quality of the time division multiplexed communication channel.

12. The method of claim 11, wherein the step of determining the carrier-to-interference plus noise ratio of the first time slot comprises the step of determining the carrier-to-interference plus noise ratio of the first time slot over a plurality of time frames to produce the first signal quality determination.

13. The method of claim 12, wherein the step of determining the carrier-to-interference plus noise ratio of the second time slot comprises the step of determining the carrier-to-interference plus noise ratio of the second time slot over a plurality of time frames to produce the second signal quality determination.

14. A method for a communication device to determine that the communication device needs to be handed off from a first communication channel to a second communication channel, the method comprising the steps of:

receiving a signal via the first communication channel to produce a received signal, wherein the first communication channel includes a plurality of channel portions;

determining a signal quality of a first channel portion of the plurality of channel portions based on the received signal to produce a first signal quality determination;

determining a signal quality of at least a second channel portion of the plurality of channel portions based on the received signal to produce at least a second signal quality determination, wherein the second channel portion comprises a different portion of the first communication channel than the first channel portion comprises; and when a signal quality determination of the first signal quality determination and at least the second signal quality determination indicates a signal quality that is lower than a desired signal quality, determining that the communication device needs to be handed off from the first communication channel.

15. The method of claim 14, further comprising the step of transmitting a handoff request to a communication system infrastructure device upon determining that the communication device needs to be handed off from the first communication channel.

16. The method of claim 14, wherein the first signal quality determination and at least the second signal quality determination comprise carrier-to-interference plus noise ratios.

17. The method of claim 14, wherein the first signal quality determination and at least the second signal quality determination comprise received signal strength indications.

18. The method of claim 14, wherein the step of determining that the communication device needs to be handed off comprises the step of determining that the communication device needs to be handed off when a signal quality determination of the first signal quality determination and at least the second signal quality determination is less than a signal quality threshold.

19. The method of claim 14, wherein the first signal quality determination and at least the second signal quality determination comprise bit error rates.

20. A method for a base site to determine that a communication device needs to be handed off from a first communication channel to a second communication channel, the method comprising the steps of:

receiving a signal via the first communication channel to produce a received signal, wherein the first communication channel includes a plurality of channel portions;

determining a signal quality of a first channel portion of the plurality of channel portions based on the received signal to produce a first signal quality determination;

determining a signal quality of at least a second channel portion of the plurality of channel portions based on the received signal to produce at least a second signal quality determination, wherein the second channel portion comprises a different portion of the first communication channel than the first channel portion comprises; and when a signal quality determination of the first signal quality determination and at least the second signal quality determination indicates a signal quality that is lower than a desired signal quality, determining that the communication device needs to be handed off from the first communication channel.

* * * * *